March 14, 1967 R. S. ZOLUDOW 3,308,851
PNEUMATIC CONTROLLED SELECTOR VALVE
Filed July 10, 1964
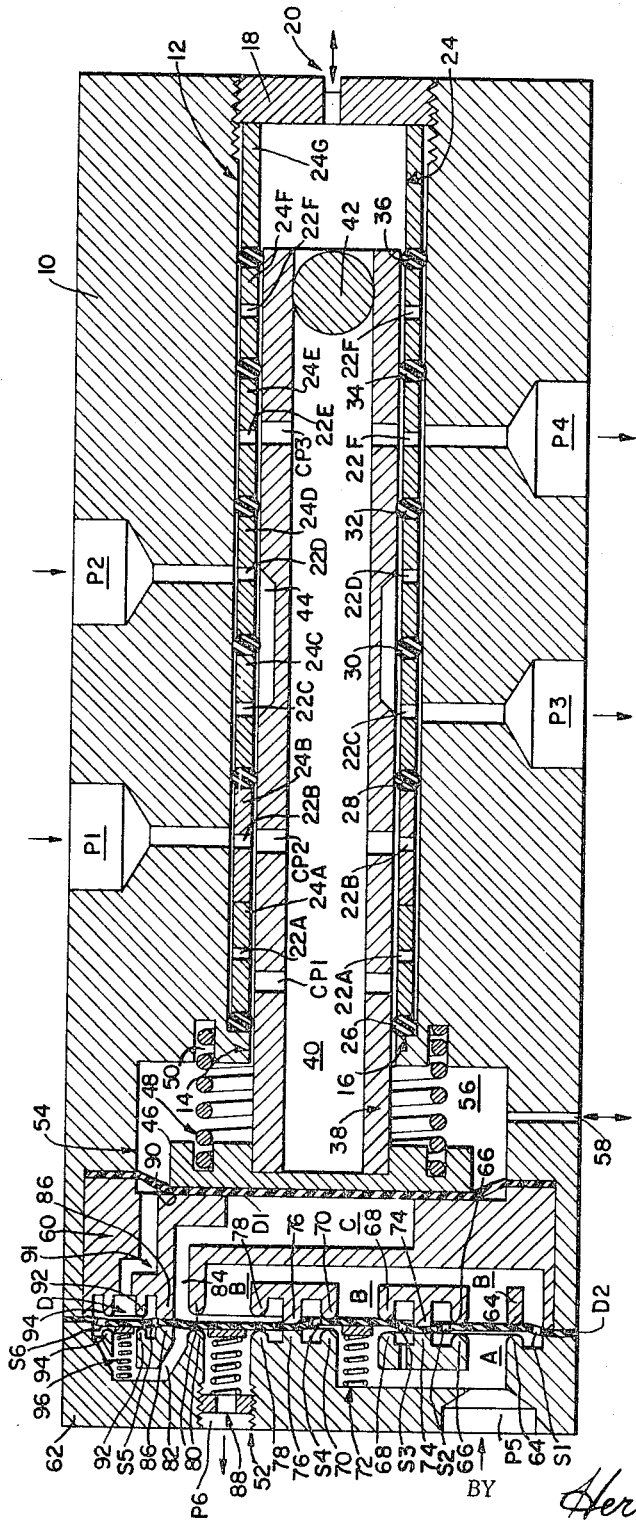
INVENTOR
Richard S. Zoludow
BY Herbert M. Birch
ATTORNEY

United States Patent Office 3,308,851
Patented Mar. 14, 1967

3,308,851
PNEUMATIC CONTROLLED SELECTOR VALVE
Richard S. Zoludow, South Bend, Ind., assignor to Robertshaw Controls Company, Richmond, Va., a corporation of Delaware
Filed July 10, 1964, Ser. No. 381,641
10 Claims. (Cl. 137—625.48)

This invention relates to pneumatically controlled selector valves and more particularly to multi-way flow control valves having a plurality of flow ports selectively interconnected by a displacement modulated flow control means.

It is an object of this invention to provide a multi-way selector valve means providing a readily variable number of flow paths therein without the need of structural modifications.

Another object of this invention is to provide a multi-way selector valve having a variable number of flow paths therein, including an integral pneumatic actuator of the displacement modulated type.

Another object of this invention is to provide a multi-way selector valve having a variable number of flow paths therein, including an integral pneumatic actuator of the displacement modulated type, said pneumatic actuator including a novel diaphragm means.

Yet another object of this invention is to provide a novel multi-way selector valve means having a small number of readily fabricated parts which are inexpensive, versatile and reliable in operation.

These and other objects of this invention will become more fully apparent with reference to the following specification and drawing, which relate to a preferred embodiment of the invention.

The drawing is a longitudinal cross-section of the selector valve of the present invention.

Referring in detail to the drawing, the selector valve is shown as including a hollow cylindrical valve body 10 having first, second, third and fourth radial flow ports P1, P2, P3 and P4, respectively, extending therethrough from the exterior thereof to a central axial bore 12 therein.

The inner end of the bore 12 includes a stepped-down portion defined by an annular shoulder 14 having a radial seating surface 16 thereon. The outer end of the bore 12 is internally threaded to receive a plug 18 having a vent 20 therein which vents the bore 12 to atmosphere.

The pressure ports P1, P2, P3 and P4 communicate with the bore 12 through a plurality of connecting ports 22A, 22B, 22C, 22D, 22E and 22F in an inner sleeve member 24 which is coterminate with the bore 12 and internally concentric therewith.

The inner sleeve 24 is comprised of a plurality of axially stacked cylindrical sections 24A, 24B, 24C, 24D, 24E, 24F and 24G extending, respectively, from the radial surface 16 on the annular shoulder 14 to the bore plug 18.

The section 24A is separated from the radial surface 16 by means of a first resilient O-ring 26 compressed therebetween.

The sections 24A and 24B are in direct abutment such that the connecting ports 22A and 22B therein, respectively, are in mutual communication and in communication with the bore 12. The inner sleeve 24 is of slightly lesser radius than the bore 12, whereby adjacent ones of the communicating ports 22 are in mutual communication unless otherwise isolated.

The sleeve sections 24B and 24C are separated by a resilient O-ring seal 28 whereby the communicating ports 22C are pressure isolated, the O-ring 28 being in mutual sealing engagement with the two said sections and the wall of the bore 12.

The sleeve sections 24C and 24D are separated by an O-ring seal 30 in mutual sealing engagement therewith and with the wall of the bore 12, whereby the communicating ports 22D are pressure isolated.

The sleeve sections 24D-24E and 24E-24F are likewise separated by O-ring seals 32 and 34, respectively, providing for pressure isolation, respectively, of communicating ports 22E and 22F.

An additional O-ring seal 36 separates the sleeve sections 22F and 22G.

The flow ports P1, P2, P3 and P4 are selectively interconnected via an axially displaceable cylindrical valve spool 38 internally concentric with the sleeve 24 and in mutual frictional engagement with the O-ring seals 26, 28, 30, 32, 34 and 36.

The valve spool 38 is provided with a central bore 40 closed at the end adjacent the vent plug 18 by plug means 42.

In the embodiment shown, the valve spool 38 is provided with first, second and third sets of control ports CP1, CP2 and CP3, respectively, which are in mutual communication with the bore 12 and the spool bore 40. These control ports CP1, CP2 and CP3 may be selectively interconnected with the connecting ports 22A, 22B, 22C, 22D, 22E and 22F by virtue of the isolating action of the O-rings 26, 28, 30, 32, 34 and 36.

An annular flow channel or a slot 44 as shown in the outer periphery of the valve spool 38 is provided for selective interconnection of the main flow ports P1, P2, P3 and P4 and connecting of adjacent ones of the communictaing ports 22A, 22B, 22C, 22D, 22E and 22F by bypassing certain of the O-rings 26, 28, 30, 32, 34 and 36 as will be hereinafter more fully described.

The inner end of the valve spool 38 is seated axially in a piston 46, thereby sealing the inner end of the spool bore 40.

The piston 46 is engaged with an axially disposed compression spring 48 externally concentric with the spool 38 and bore 12, the said spring 48 being seated in an annular groove 50 adjacent the annular shoulder 14 at the inner end of the bore 12. The opposite face of the piston 46 is abutted with the motor diaphragm D1 of a pneumatic actuator 52, the said motor diaphragm being mounted in an enlarged axial bore portion 54 of the valve body 10 to form therewith a piston chamber 56 which is vented to atmosphere via a vent 58.

The pneumatic actuator 52 includes a ported and chambered tooled or cast insert 60 mounted in the valve body 10 on the opposite side of the motor diaphragm D1 from the piston 46 and a ported end cap 62 cooperating with the insert 60. A relay diaphragm D2 is sandwiched between the end cap 62 and insert 60 and includes first, second, third, fourth, fifth and sixth pressure transmitting slits S1, S2, S3, S4, S5 and S6 therein, respectively, which cooperates with the various ports and chambers in the said end cap 62 and insert 60 to control the flow of pneumatic fluid therebetween as will be hereinafter described.

The end cap 62 is provided with a signal pressure inlet port P5 and an exhaust port P6.

The inlet port P5 and relay diaphragm D2 form a first pressure chamber A which receives the input signal pressure from a suitable pressure source not shown. On opposite side of the relay diaphragm D2, within the insert 60 is a second pressure chamber B.

Between the chambers A and B, are a plurality of pairs of opposed bosses 64—64, 66—66, 68—68 and 70—70 which permit displacement of the relay diaphragm D2 between the said bosses of each pair.

The relay diaphragm is impervious to pneumatic fluid between the boss pairs 64—64 and 66—66 and between the boss pairs 68—68 and 70—70.

The only force acting on the relay diaphragm D2 between the boss pairs 64—64 and 66—66 is generated by the pressure differential between the chambers A and B. Between the boss pairs 68—68 and 70—70, however, a first regulating compression spring and diaphragm button means 72 is provided in chamber A to bias the diaphragm D2 toward chamber B.

The first flow slit S1 is located between the bosses 64—64 and the outer walls of the chambers A and B.

Between the boss pairs 66—66 and 68—68 are integral adjoining webs 74—74 which clamp the diaphragm D2 in fixed position therebetween creating small chambers on either side of the diaphragm D2, intercommunicating via the slits S2 and S3, defined by the bosses 66 and 68 and the webs 74.

Thus, when the diaphragm is midway between the bosses of a particular boss pair, the respectively associated flow slits S1, S2, S3 and S4 are in mutual communication with both of the pressure chambers A and B. When relay diaphragm D2 is biased toward the chamber A, the said flow slits S1, S2, S3 and S4 are in communication with chamber B and vice-versa.

The relay diaphragm extends from a fixed position between integral webs 76—76 adjacent the boss pair 70—70, through a spaced pair of opposed bosses 78—78, across the exhaust port P6 on one side and a portion of the chamber B on the other, through a spaced pair of opposed bosses 80—80, across an exhaust control port 82 on said one side thereof and a motive pressure control port 84 on said other side thereof to a fixed position between a pair of opposed webs 86—86.

Between the webs 76—76 and 86—86 the relay diaphragm D2 is impervious to pneumatic fluid. Between the boss pairs 78—78 and 80—80 the said diaphragm D2 is normally biased toward the chamber B by a second regulating compression spring and diaphragm button means 88. Thus, depending on the force differential between the pressure in the chamber B and the second regulating means 88, the relay diaphragm D2 provides selective interconnection of either the exhaust control port 82 with the exhaust port P6 or the motive pressure control port 84 with the chamber B.

The motive pressure control port communicates with a motive pressure chamber C, having one wall thereof defined by the motor diaphragm D1.

Normally, the piston spring 48 and piston 46 cause the motor diaphragm D1 to seat on an annular boss 90. If the motor diaphragm D1 is displaced from the annular boss 90, the motive pressure chamber C is placed in communication with a feedback port 91, the latter being connected with an exhaust control chamber D.

The exhaust control chamber D includes pairs of spaced bosses 92—92 and 94—94 which form separate chambers confining, respectively, the fifth and sixth flow slits S5 and S6 of the relay diaphragm D2 in the manner hereinbefore with respect to the flow slits S1, S2, S3 and S4.

The relay diaphragm D2 is impervious to pneumatic fluid intermediate the boss pairs 92—92 and 94—94.

The exhaust control port 82 communicates directly with the relay diaphragm D2 between the said boss pairs 92—92 and 94—94 and includes a third regulating spring and diaphragm button means 96 which normally biases the relay diaphragm D2 towards the exhaust control chamber D wherein it is opposed by the force of the pressure in that chamber.

OPERATION

In operation, in the position shown, the first flow port P1 is connected with the fourth flow port P4 via connecting ports 22B and 22A, control ports CP1 and CP2, bore 40 of the spool 38, control ports CP3 and connecting ports 22E.

Also, in the position shown, the second flow port P2 is connected with the third flow port P3 via connecting port 22D, annular control flow channel 44 on the spool 38 and connecting port 22C.

Assuming the above described flow conditions as the initial position of the selector valve spool 38 and piston 46, which represents a condition of minimum or ineffective input pressure applied to the input port P5 of the pneumatic actuator 52, the valve spool is constrained to undergo axial displacement as follows.

Initially the first and second regulating means 72 and 88, respectively, bias the respectively associated portions of the relay diaphragm D2 against the bosses 68–70 and 78–80, respectively, in the chamber B.

The third regulating means 96 initially biases its associated portion of the relay diaphragm D2 against the bosses 92–94 in the exhaust control chamber D.

When signal pressure is introduced in the input chamber A, the relay diaphragm D2 is forced against the bosses 64–70 in the chamber B and a flow of pneumatic pressure fluid results from chamber A to chamber B via the first flow slit S1.

Pressure thus increases in the chamber B until such time as the force opposing the second regulating means 88 through the relay diaphragm D2 causes the said diaphragm to unseat from the bosses 78–80 in the chamber B, thus connecting the chamber B with the motive pressure chamber C via the motive pressure control port 84.

Pressure now increases in motive pressure chamber C and exerts an axial force on the piston 46 through the motor diaphragm D1. As the pressure increases, the force of the piston spring 48 is overcome, as well as the friction of the O-ring seals 26, 28, 30, 32, 34 and 36 and the valve spool 38 is ultimately shifted axially in the bore 12 a distance substantially equal to the length of one of the individual sections of the sleeve 24 (i.e. the distance between adjacent connecting ports 22) which bring the end plug 42 in the bore 40 thereof into immediate proximity with the bore plug 18 in the valve body 10. This displacement, if sudden is cushioned by the limited rate of air out of the sleeve section 24G via the atmospheric vent 20.

Spring 48, however, is designed with a low spring rate in the preferred embodiment shown such that there need only be a small pressure differential in the motive chamber C between the start and finish of the stroke of the valve spool 38.

As the piston 46 is displaced, the motor diaphragm D1 is unseated from the annular boss 90, connecting the motive power chamber C with the exhaust control chamber D via the feedback port 91.

As the pressure in the exhaust control chamber D is increased it acts through the relay diaphragm D2 to overcome the opposing force of the third regulating means 96 and force the said diaphragm D2 against the bosses 92–94 in the exhaust control port 82. This causes a pressure flow from the control chamber D to the control port 82 via the fifth and sixth flow slits S5 and S6. This results in an ultimate pressure in the exhaust control port 82 equal to the force generated by the pressure in chambers B, C and D minus the force of the third regulating means 96.

Consequently, as long as the signal pressure in the input chamber A is maintained, the differential between the chamber B maintains the relay diaphragm D2 seated against the bosses 78–80 in the exhaust port P6 such that the pressures in all of the chambers A, B, C and D are maintained at an equilibrium level which corresponds to the full stroke position of the valve spool 38 in the valve bore 12.

To return the valve spool 38 to the position shown in the drawing, the signal pressure is decreased at the signal port P5 causing a reduction in pressure in the inlet chamber A.

The resulting pressure differential between chambers A and B causes the relay diaphragm D2 to engage the bosses 64–66 in the chamber A but no flow takes place because the first and second flow slits S1 and S2, respectively, are effectively blocked by the said bosses 64–66.

However, as the signal pressure is decreased further it reaches a level at which the pressure differential from chamber B to chamber A exerts a greater force on the relay diaphragm D2 than the opposing force of the first regulating means 72. This results in a shift of the relay diaphragm D2 from a position against the bosses 68–70 in the chamber B into engagement with the corresponding bosses 68–70 in the chamber A.

Consequently, a pressure flow results through the third and fourth diaphragm slits S3 and S4, respectively, until such time as the pressure in chamber B exerts a force on the relay diaphragm D2 equal to the signal pressure force in chamber A plus the force exerted by the first regulating means 72.

This pressure decrease in chamber B is of greater magnitude than the pressure differential existing between it and the exhaust control port 82 and thus, the second regulating means 88 forces the relay diaphragm D2 against the bosses 78–80 in the chamber B. As a result, the exhaust control port 82 is connected with the exhaust port P6, and this further connects the exhaust control chamber D, the feedback port 91, and the motive power chamber C with the exhaust port P6.

Thus, the pressure in the motive power chamber C is exhausted to atmosphere via feedback port 91, chamber D, flow slits S5 and S6, control port 82 and exhaust port P6. This flow continues until the pressure in the exhaust control chamber D is insufficient to overcome the opposing force of the third regulating means 96 on the relay diaphragm D2, at which point the flow will cease, the diaphragm D2 being then seated on the bosses 92–94 in the control chamber D.

The piston spring 48 is designed to have a much greater force than the third regulating means 96, such that when the exhaust of motive pressure ceases, the piston 46 and the valve spool 38 will have been returned to the initial position shown in the drawing.

The difference between the forces exereted on the relay diaphragm D2 by the first and third regulating means 72 and 96, respectively, determines the pressure differential between the full stroke and retracted positions of the selector valve of the present invention.

The set point of the selector valve (i.e. the initial pressure required to commence a stroke of the valve spool 38) is determined by the second regulating means 88 and is adjustable thereby to any desired pressure level.

It is to be understood that the pneumatic actuator 52 can actuate more than the one set of force flow ports shown. Additional sets of ports may be appended to the selector valve by extension of the housing 10, sleeve 24, and spool 38, observing the limitations placed on ultimate size based on the amplitude of signal pressure required to overcome the force of the piston spring 48 and the friction of additional O-rings 26–36.

As can be seen from the foregoing specification and drawings this invention provides a novel multi-way selector valve and integral pneumatic actuator structure utilizing a single novel relay diaphragm and a motor diaphragm and a novel combination of pressure differential and set point control means and having a novel porting structure which provide a simple and versatile selector valve mechanism which is positive in operation, low in cost and has a minimized number of parts.

It is to be understood that the preferred embodiment of the invention shown and described herein is for the purpose of example only and is not intended to limit the scope of the appended claims.

What is claimed is:

1. Selector valve means comprising a valve body, a bore in said body, a plurality of flow ports in said body adapted to be selectively interconnected and commonly connected with said bore, sleeve means telescopically inserted in said bore, valve spindle means in said sleeve means axially displaceable therein, interconnecting port means in said sleeve means adjacent each of said flow ports, isolating means in said sleeve means cooperating with the periphery of said bore and said spindle to isolate said interconnecting port means from each other, control means in said valve spindle selectively interconnecting combinations of said flow ports through said interconnecting port means and said valve spindle as a function of displacement of said valve spindle, pneumatic motor means selectively displacing said valve spindle and an apertured relay diaphragm for controlling said motor means in response to pressure differential across opposite sides thereof.

2. The invention defined in claim 1, wherein said sleeve means comprises a plurality of axially stacked sleeve sections, each of said sections including said interconnecting port means and wherein said isolating means comprises a plurality of resilient O-ring seals inserted in mutual juxtaposition between adjacent ones of said sleeve sections and frictionally engaging said periphery of said bore and said valve spindle.

3. The invention defined in claim 1, wherein said valve spindle includes a closed hollow axial bore and wherein said control means in said valve spindle comprise radial flow ports selectively interconnecting said axial bore with selected ones said interconnecting port means and flow channel means selectively interconnecting adjacent ones of said interconnecting port means.

4. The invention defined in claim 1, wherein said sleeve means comprises a plurality of axially stacked sleeve sections, each of said sections including said interconnecting port means and wherein said isolating means comprises a plurality of resilient O-ring seals inserted in mutual juxtaposition between adjacent ones of said sleeve sections and frictionally engaging said periphery of said bore and said valve spindle; and further wherein said valve spindle includes a closed hollow axial bore and wherein said control means in said valve spindle comprise radial flow ports selectively interconnecting said axial bore with selected ones of said interconnecting port means and peripheral flow channel means selectively interconnecting adjacent ones of said interconnecting port means by providing a flow path around one of said O-ring seals.

5. Selector valve means comprising a valve body, a bore in said body, a plurality of flow ports in said body adapted to be selectively interconnected and commonly connected with said bore, sleeve means telescopically inserted in said bore, valve spindle means in said sleeve means axially displaceable therein, interconnecting port means in said sleeve means adjacent each of said flow ports, isolating means in said sleeve means cooperating with the periphery of said bore and said spindle to isolate said interconnecting port means from each other, control means in said valve spindle selectively interconnecting combinations of said flow ports through said interconnecting port means and said valve spindle as a function of displacement of said valve spindle, and means selectively displacing said valve spindle, said means selectively displacing said valve spindle comprising a piston integral with said valve spindle, spring means engaging said piston biasing said spindle in one axial direction, motor diaphragm means engaging said piston in opposition to said spring means and pneumatic relay means pneumatically displacing said motor diaphragm means against the force of said spring means.

6. The invention defined in claim 5, wherein said pneumatic relay means includes first, second and third pressure regulating means, said first regulating means controlling the set point and said second and third regulating means jointly controlling the pressure differential, respectively, of said means selectively displacing said valve spindle.

7. The invention defined in claim 5, wherein said pneumatic relay includes an input chamber adapted to be connected to a variable source of signal pressure, an exhaust chamber, an exhaust control port, an intermediate chamber, a motive pressure chamber and an exhaust control chamber, relay diaphragm means providing first and second common wall portions between said input and intermediate chambers, a third common wall portion between said exhaust and intermediate chambers, a fourth common wall portion between said exhaust control port and said motive pressure chamber and a fifth common wall portion between said exhaust control port and said exhaust control chamber, flow apertures in said relay diaphragm means adjacent said first, second and fifth wall portions thereof, boss means in said chambers engageable with said relay diaphragm selectively controlling flow through said slits and between said intermediate and motive pressure chambers and said exhaust control chamber and exhaust control port and engageable with said motor diaphragm selectively controlling flow between said motive pressure and exhaust control chambers, first regulating means biasing said second wall portion toward said boss means in said intermediate chamber, second regulating means biasing said third wall portion toward said boss means in said intermediate chamber and third regulating means biasing said fifth wall portion toward said boss means in said exhaust control chamber.

8. In a selector valve mechanism including a valve spindle, means selectively displacing said valve spindle along its longitudinal axis comprising a piston integral with said valve spindle, spring means engaging said piston biasing said spindle in one axial direction, motor diaphragm means engaging said piston in opposition to said spring means and pneumatic relay means pneumatically displacing said motor diaphargm means against the force of said spring means; and wherein said pneumatic relay means includes first, second and third pressure regulating means, said first regulating means controlling the set point and said second and third regulating means jointly controlling the pressure differential, respectively, of said means selectively displacing said valve spindle.

9. The invention defined in claim 8 wherein said pneumatic relay further includes an input chamber adapted to be connected to a variable source of signal pressure, an exhaust chamber, an exhaust control port, an intermediate chamber, a motive pressure chamber and an exhaust control chamber, relay diaphragm means providing first and second common wall portions between said input and intermediate chambers, a third common wall portion between said exhaust and intermediate chambers, a fourth common wall portion between said exhaust control port and said motive pressure chamber and a fifth common wall portion between said exhaust control port and said exhaust control chamber, flow apertures in said relay diaphragm means adjacent said first, second and fifth wall portions thereof, and boss means in said chambers engageable with said relay diaphrgam selectively controlling flow through said slits and between said intermediate and motive pressure chambers and said exhaust control chamber and exhaust control port and engageable with said motor diaphragm selectively controlling flow between said motive pressure and exhaust control chambers, said first and second regulating means biasing said second and third wall portions, respectively, toward said boss means in said intermediate chamber and said third regulating means biasing said fifth wall portion toward said boss means in said exhaust control chamber.

10. A pneumatic motor including a diaphragm operatively associated with a pneumatic relay means, said motor means selectively displacing a displaceable control means and said motor means comprising a piston carried by an end of said control means, spring means engaging said piston adapted to bias said control means in a first direction, said motor diaphragm means engaging said piston in opposition to said spring means; and pneumatic relay means pneumatically displacing said motor diaphragm against the force of said spring means, said pneumatic relay means including first, second and third pressure regulating means, said first regulating means controlling the set point and said second and third regulating means jointly controlling the pressure differential, respectively, of said means selectively displacing said control means.

References Cited by the Applicant
UNITED STATES PATENTS 2,955,617 10/1960 Gollins.
3,010,438 11/1961 Fife et al.
3,076,477 2/1963 Brandenberg.
3,107,693 10/1963 Puster et al.

FOREIGN PATENTS 724,496 4/1932 France.
1,024,700 2/1958 Germany.

M. CARY NELSON, *Primary Examiner.*

H. KLINKSIEK, *Assistant Examiner.*